Jan. 26, 1954
R. G. BROWN
2,667,615
ELECTROSTATIC GENERATOR
Filed Jan. 30, 1952
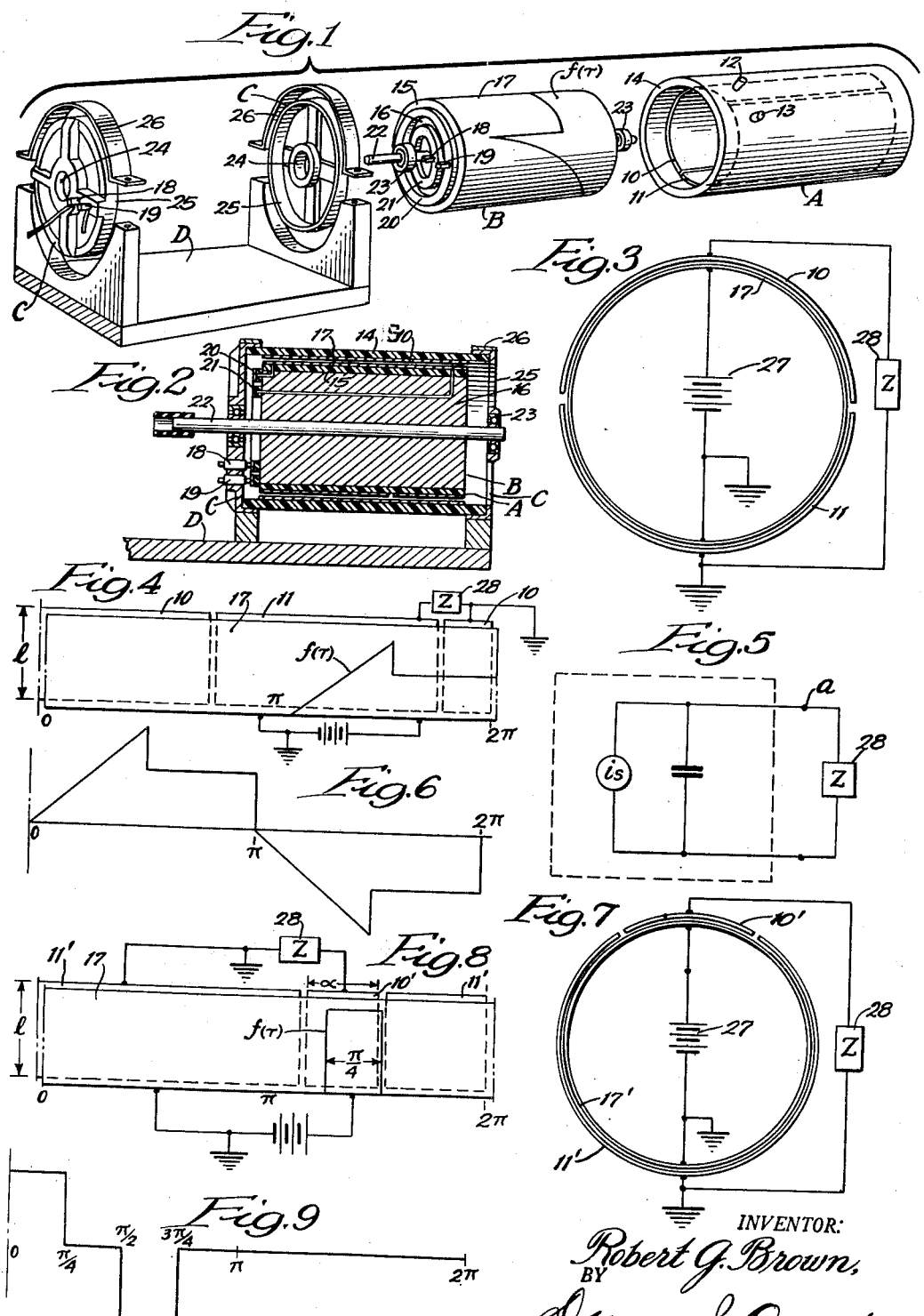
INVENTOR:
Robert G. Brown,
BY
Dawson & Ooms,
ATTORNEYS.

Patented Jan. 26, 1954

2,667,615

UNITED STATES PATENT OFFICE 2,667,615

ELECTROSTATIC GENERATOR

Robert G. Brown, Downey, Calif.

Application January 30, 1952, Serial No. 269,050

9 Claims. (Cl. 322—2)

This invention relates to an electrostatic induction generator characterized by the capacity to induce an alternating current which is essentially independent of output voltage with the result that the generator is a constant current source. The generator of this invention has particular utility in generating alternating currents of selected, predetermined wave shapes.

It has long been known that a voltage may be induced in an electric circuit by changing the magnetic flux linkage of that circuit with respect to time. Electromagnetic generators operate on this principle. The generator of this invention operates on an entirely different principle. This principle is that an electric current may be induced by changing the electric flux terminating on a conducting surface with respect to time. Such a generator is basically a current inducing device in contrast to the voltage inducing device of the electromagnetic type. My alternating current generator is then essentially a constant current source, that is, the output current is independent of the external load or output voltage.

Also, the generator of this invention differs considerably from present electrostatic generators both in principle of operation and purpose. The classical electrostatic generators of the Toepler-Holtz and Wimshurst type are designed to produce high voltages by means of accumulating large static charges, whereas the current inducing device described herein produces an alternating current having a predetermined wave shape.

A number of devices are known which will produce electric currents with particular wave shapes, but all are somewhat limited in their application. Perhaps the most versatile device available at present is the Photoformer. However, it is relatively complex, involving a cathode-ray-tube and extensive electronic circuits, and is also quite expensive. The generator of this invention provides a simple and direct means of producing currents with unusual wave form.

It is then an object of this invention to provide an electrostatic generator for directly inducing an alternating current. Another object of this invention is to provide an alternating current generator in which the output current is essentially independent of output voltage over a wide range of load impedance. Still another object is to provide an alternating current generator in which the output current may be accurately predicted. An additional object of this invention is to provide a generator in which an output current of selected, predetermined wave shape may be produced. Still another object is to produce an alternating current of predetermined wave shape in which the positive and negative portions of the output current may be selectively made symmetrical or unsymmetrical during each cycle as desired. Yet another object is to provide a generator that is simple in design and construction to produce unusual wave shapes accurately, and which has wide flexibility in wave shape production. Additional specific objects and advantages will appear as this specification proceeds.

The generator of my invention constitutes generally at least two electrically separate conductive surfaces, and a member having a conductive surface supported to permit relative movement between the member and the separate surfaces so that the conductive surface of the member is alternately positioned in spaced-apart, facing relation with each of the separate conductive surfaces. Means are provided to charge at least a portion of the surface of the member to a potential with respect to the surfaces with the result that electric lines of flux from the member terminate on the other surfaces.

The relative movement between the member and the surfaces changes the electric flux terminating on the surfaces and an alternating current is thereby induced that is essentially independent of the output voltage.

If the conductive surface of the member is divided into two electrical separate segments along a line defined by the boundary curve of a wave shape that is a periodic function of time and a charge placed on the area bounded by the curve different from a charge placed on the separate surfaces and the area outside of the curve, the wave shape of the output current will be a reproduction of this function.

My invention can best be understood by referring to a single embodiment illustrated by the accompanying drawing in which—

Fig. 1 is an exploded perspective view showing the stator and rotor assemblies and their supporting structure; Fig. 2, a cross-sectional side view of the generator in position for rotation; Fig. 3, an end view of the stator and rotor plates and wiring diagram for producing a symmetrical output current; Fig. 4 is a rolled out view of the stator and rotor plates with the wave shape to be produced sketched on the rotor; Fig. 5 is a wiring diagram of the equivalent circuit for the generator; Fig. 6 is a view showing the wave shape of the generator output current produced by the wave form sketched on the rotor in Fig. 4; Fig. 7 is a view showing a modification of the stator plates shown in Fig. 3 for producing an unsymmetric output current; Fig. 8 is a rolled out view of the stator and rotor plates shown in Fig. 7 with a wave shape sketched on the rotor; and Fig. 9 is a view showing the output current wave form produced by the wave shape sketched on the rotor in Fig. 8.

Fig. 1 shows a stator assembly A, a rotor assembly B, holders or supports C for positioning and supporting the stator and rotor assemblies, and a base D to which the holders are secured. The stator A has two conducting surfaces or plates 10 and 11. The output current is taken from the terminals 12 and 13 which are electrically connected to the plates 10 and 11 respectively. In the embodiment of my invention illustrated the plates 10 and 11 are produced by painting the inner surface of a dielectric tube 14 with a metallic paint. Any insulating or dielectric material may be used to form the tubing 14. The plates 10 and 11 are electrically separated or insulated from each other. The particular paint used here is a silver paint, however, other similar paints may readily be used since it is not necessary that the surfaces or plates have a high conductivity. The currents involved are relatively small and the plates or conductive surfaces employed need only be able to distribute a charge of electricity over the total area of the plates. It is understood, of course, that the plates may be constructed in other manners such as by securing a metal foil or other pre-shaped surface of conductive material to the tubing 14. Also, the tube 14 could be eliminated since the plates 10 and 11, constructed of a sufficiently rigid material and separated electrically from each other, could serve as the complete stator.

The rotor B is formed of an insulating material constituting a tube 15 secured about a cylinder of wood 16. It was found that this particular arrangement gave the desired structural properties, however, a one-piece solid cylinder of insulating material may well be used as might other combinations of insulating surfaces surrounding an inner cylinder of conductive material, etc. The outer surface of the tube 15 is covered with a silver paint to form the rotor plate 17. As indicated before, other surfaces might readily be used, but a conducting paint is desirable because of the considerable flexibility that it affords.

The outer diameter of the tube 15 must be small enough to allow the rotor B to be positioned concentrically within the stator A, leaving a sufficient air-gap to permit relative motion between the two. Brushes 18 and 19 ride on slip-rings 20 and 21 which are electrically connected to the rotor plate 17 as seen best in Fig. 2.

The rotor B is mounted on an axle 22 provided with race end bearings 23 at each end. The bearings are received within the openings 24 provided in the end pieces 25 of the holders C. The end pieces 25 receive each end of the stator A and maintain the spacing between stator and rotor. The clamps 26 secure the end pieces to the base D. When assembled in the supporting structure, the rotor may be rotated by any suitable means, such as an electric motor (not shown).

Fringing effects are decreased as the spacing between the stator and rotor plates is made smaller. Therefore, the inner surface of the stator A was painted to form the plates 10 and 11, thereby minimizing the spacing between the stator and rotor plates. However, the air-gap separating the plates must be sufficient to prevent arcing between the plates and to permit rotation. The spacing could be decreased, within mechanical limits, by providing a dielectric medium having greater insulating properties than air. Also, the ends of the stator and rotor plates are positioned opposite each other (the plates are the same length) since this lessens fringing effects.

The desired wave form is placed on the rotor with the X axis or base axis along a circumference of the rotor plate and the Y axis extending along the length of the rotor. The portion of the plate surface under the curve constituting a wave form must be separated or insulated electrically from the remainder of the rotor plate. Since a metallic paint is used to form the plates, this is accomplished by scraping the paint from the tubing 15 along the boundary of the wave shape. Thus, to replace the wave shape or function on the plate, the old boundary need merely be painted over and a new wave shape drawn.

The electrical circuit is shown in Fig. 3. A direct current source 27 is employed with the positive terminal of the source connected through the brush 18 to the area of the rotor plates 17 under the curve forming the wave shape. The remainder of the rotor plate 17 is connected to ground potential as are the plates 10 and 11 of the stator A. The negative terminal of the direct current source, of course, is also connected to ground. Placing the area of the rotor plate above the curve at ground potential causes the capacitance between the stator and rotor to be independent of rotor position. This results in increased accuracy in the wave shape reproduction. A load 28 is connected between the stator plates 10 and 11. Under ideal conditions the load 28 would be a short circuit, but since a short circuit would provide no output voltage, a load is used that has a value as near that of a short circuit as possible and that will still yield the desired output voltage.

Predictability of the current output developed by this current generator can be determined with accuracy, and the mathematical analysis of the output current will now be set out. In the following analysis, the current output will be shown to be a function of the wave shape sketched on the rotor. This is established mathematically as follows:

With the circuit shown in Fig. 3, a positive electric flux terminates on plate 10 and a positive current flows away from this plate. The charge on the plate 10 is numerically equal to the electric flux. Stated symbolically (the rationalized MKS system of units is used throughout)

$$q = \psi \qquad (1)$$

where $q$ is the charge and $\psi$ the electric flux. Differentiating this equation with respect to time yields $$\frac{dq}{dt} = \frac{d\psi}{dt} = i \qquad (2)$$

Thus, it is seen that a change in flux with respect to time induces a current on the plate 10. This is analogous to an E. M. F. induced by a change of magnetic flux linkage, and may be thought of as a change of "electric flux linkage." This term is used herein in this sense.

Figs. 3, 4, and 6 show the case where the stator plates are symmetrical. Fig. 4 is a rolled out view of the rotor and stator plates shown in Fig. 3 in which a wave shape or function $F(\tau)$ is placed on the rotor plate 17 so as to separate it electrically into two sectors. Only the portion of the plate 17 under the curve is connected to the positive terminal of the source 27. To produce the symmetrical output wave shown in Fig. 6, the stator plates should be rectangular in shape and have the same length and width, as shown in Fig. 4.

The calculations immediately following will be limited to the symmetrical case, and the load 28 will be assumed to be a short circuit. All of the surfaces then except the positive portion of the rotor 17 under the curve $F(\tau)$ will be at the same (ground) potential.

In order to simplify the calculations, it will be assumed that:

(a) The distance between rotor and stator is uniform and that this distance is small with respect to the length and circumference of the cylinders.
(b) The rotor is moving with a constant angular velocity.
(c) The D.-C. voltage applied to the rotor is held constant.
(d) All fringing effects are small and can be neglected.

Also the following symbols are used, and the rationalized MKS system of units is used exclusively.

(a) $l$ is the length of the rotor (and stator).
(b) R is the radius of the rotor and stator. They are approximately equal.
(c) $t$ is time.
(d) $\omega$ is the angular velocity of the rotor.
(e) $\tau$ is the angular displacement of the rotor with respect to an arbitrary fixed reference point and is equal to $\omega t$.
(f) A is that portion of the area under the curve which is directly "under" plate 10.
(g) $f(\tau)$ is the function of $\tau$ described by the curve on plate 17. It is to be considered periodic and only the portion of the curve from 0 to $\pi$ appears on plate 17.
(h) $F(\tau)$ is the entire function bounding the positive area of the rotor. Stated mathematically, $$F(\tau)=f(\tau), \quad n\pi<\tau<(n+1)\pi$$
where $n=0, 2, 4 \ldots$
$$F(\tau)=0, \quad n\pi<\tau<(n+1)\pi$$
where $n=1, 3, 5 \ldots$ (i) E is the D.-C. rotor voltage.
(j) $\epsilon$ is the permittivity of the air gap.
(k) $\delta$ is the air gap distance between the rotor and stator.
(l) $q$ is the charge on plate 10.
(m) $i$ is the current flowing away from plate 10.
(n) $\psi$ is the electric flux terminating on plate 10.
(o) C' is equal to $$\frac{\epsilon \pi R l}{\delta}$$

Let the relative motion of stator plate 10 with respect to the rotor be to the right in Figure 4. Also, let the maximum value of $f(\tau)$ be unity and extend the full length of the rotor as shown in the figure. The area A is then, $$A=Rl\int_{\tau-\pi}^{\tau}F(\tau)d\tau$$

$$=Rl\left[\int_{0}^{\tau}F(\tau)d\tau-\int_{0}^{\tau-\pi}F(\tau)d\tau\right] \quad (3)$$

The electric flux $\psi$ which terminates on plate 10 is $$\psi=\frac{\epsilon E A}{\delta}$$

and $$\frac{d\psi}{dt}=i=\frac{\epsilon E}{\delta}\frac{dA}{dt}$$

$$=\frac{\epsilon E}{\delta}\frac{dA}{d\tau}\frac{d\tau}{dt}$$

But $$\frac{dA}{d\tau}=Rl[F(\tau)-F(\tau-\pi)]$$

Therefore, $$\frac{d\tau}{dt}=\omega$$

$$i=\frac{\epsilon E R l \omega}{\delta}[F(\tau)-F(\tau-\pi)] \quad (4)$$

It will be convenient at this point to introduce a new term C'. Let $$C'=\frac{\epsilon \pi R l}{\delta}$$

Then Equation 4 becomes $$i=C'\frac{E\omega}{\pi}[F(\tau)-F(\tau-\pi)]$$

From elementary field theory it can be seen that C' is the capacitance between plates 10 and 17 (or 11 and 17) when they are in the position shown in Figure 3.

The output current wave form $$[F(\tau)-F(\tau-\pi)]$$

is a new function with zero average value and is equal to $f(\tau)$ from 0 to $\pi$ and $-f(\tau-\pi)$ from $\pi$ to $2\pi$. That is, the positive half-cycle is repeated negatively in the second half-cycle as shown in Figure 6. The wave therefore inherently possesses half-wave symmetry and cannot contain any even harmonics.

Let the output of the generator be connected to a load Z and let the voltage across this load be denoted by $v_0$. Let Z be composed of any combination of elements either active or passive or even non-linear.

The electric field in the air gap between 10 and 17 may be thought of as being composed of two components, one due to the voltage E as before and a field in the opposite direction due to $v_0$. There is an essential difference, however, the flux emanating from 10 to 17 due to $v_0$ does not depend on $f(\tau)$, but rather, it terminates on the entire rotor surface directly under plate 10. This component of flux depends on $v_0$ but not upon the position of the rotor. Stated in mathematical form, the total flux terminating on plate 10 is $$\psi=\frac{\epsilon E A}{\delta}-\frac{\epsilon v_0 \pi l R}{\delta}$$

$$=\frac{\epsilon E A}{\delta}-v_0 C'$$

and $$\frac{d\psi}{dt}=i=\frac{d}{dt}\left[\frac{\epsilon E A}{\delta}\right]-C'\frac{dv_0}{dt} \quad (5)$$

The output current can be seen to be composed of two components. The first term is the short circuit current obtained in the previous case and is not a function of the load voltage $v_0$. This implies a constant current source. The second term is the current through a capacitance $C'$ with a voltage $v_0$ across its terminals.

The exact equivalent circuit for the generator is shown in Figure 5. It consists of a true constant current source shunted by an internal capacitance. The circuit may be justified by summing the currents at node $a$ which results in Equation 5.

The above analysis was confined to the symmetrical case shown in Figs. 3 and 4, and Fig. 6 shows the output wave form where the stator plates 10 and 11 are symmetrical. As shown, the positive and negative portions of the output wave form are symmetrical over a complete cycle.

The stator plates, however, need not be symmetrically segmented. Figs. 7, 8 and 9 show the case where the stator plates are unequal segments. Fig. 8 is a rolled out view of the stator and rotor plates having a curve or wave form $F(\tau)$ bounding the positive area of the rotor. The restriction that $F(\tau)=0$ where $\pi<\tau<2\pi$ is now removed. However, $F(\tau)$ must still be periodic. Let $a$ be the angular width of the stator plate 10 as shown in Fig. 7. The short circuit analysis is the same as before except that $a$ replaces $\pi$. The resultant current is given by the equation.

$$i = \frac{\epsilon E R l \omega}{\delta}[f(\tau) - F(\tau - \alpha)] \quad (6)$$

An example of $F(\tau)$ and the resultant output for $a$ equal to $\pi/4$ is shown in Fig. 9. It is seen that this output wave is unsymmetrical over a complete cycle.

Numerous experiments have established that the mathematical computation of the current output for a given function or wave form is correct. These quantitative measurements consisted of measuring the output current with a sine wave generated for various values of load resistance 28. Since the current output is very small, a vacuum-tube voltmeter was used as an ammeter. The input impedance of the meter was known, and therefore the current was calculated from the voltage across the input. The shunt capacitance of the voltmeter and the reactance of the series capacitor in the input circuit of the volt meter were neglected because they were small in comparison with the impedance of the rest of the circuit. The calculated current outputs and the actual measurements were very close and the results satisfactory. Stray capacitance was found to effect the measured output so that it varied slightly from the calculated current. However, allowance for this may be easily made.

It was discovered quite unexpectedly that the constant current generator comprising my invention would produce an output current wave form of any desired periodic function placed on the rotor. After this fact became known, extensive experiments were conducted in which many different wave forms were sketched on the rotor surface and the generator output was checked on an oscillograph. It was found that the output wave forms were accurate reproductions of the wave forms or functions sketched on the rotor plate. The rise time at points of discontinuity was small, and except for a small amount of "noise" the functions were faithfully reproduced. Photographs were taken of the output waves as they appeared on the screen of the oscillograph.

A load 28 was connected across the generator output to provide a means for impressing the output wave across the oscillograph input circuit.

In choosing a load, a compromise was made between the desired level of output voltage and the allowable percentage of current to be shunted through the internal capacitance. The ideal load would be a short circuit, but this would yield no output voltage. A load was chosen having a value that resulted in practically a short circuit since the maximum output voltage across this load was very small as compared to the voltage applied across the rotor.

The function sketched on the rotor need not extend across the total length of the rotor plate. Neither is there a necessary relationship between the area enclosed within the curve or function and the total rotor area. Therefore, the maximum X and Y values of the function may extend on the rotor surface as desired. However, the base or X axis of the function must lie on a plane perpendicular to the rotational axis of the rotor since the X axis of the output wave form corresponds with the sketched function when its base or X axis is taken along such a plane.

In order that the output current be a faithful reproduction of the function sketched on the rotor, the function must be single valued. If the function is not single valued, that is, if the curve has more than one value for any value of X, the resultant output wave is a function whose value is proportional to the sum of the Y distances which are bounded by the charged area. This follows from a consideration of the areas involved. With this in mind, the output wave form when a double valued function is sketched on the rotor is still predictable.

It has been shown that the current output waveform produced by my generator may be mathematically determined. However, in practical applications the converse of this situation would more often arise. The desired output current would be known and the need would be to determine what function should be sketched on the rotor to reproduce the required output current. Therefore, the mathematical analysis necessary to solve this relationship will now be set out. Only the essential equations are included; the purely algebraic steps being omitted for the sake of brevity.

EXAMPLE I

This is the general case in which the stator plates may or may not be symmetrical.

It has been shown that the generated current is given by the equation—

$$i(\tau) = \frac{\epsilon E R l \omega}{\delta}[F(\tau) - F(\tau - \alpha)] \quad (6)$$

To determine the function to be sketched when the current is known, the problem is essentially that of solving the following difference equation for $F(\tau)$ as a function of $I(\tau)$.

$$F(\tau) - F(\tau = a) = I(\tau) \quad (7)$$

where $$I(\tau) = \frac{\delta}{\epsilon E R l \omega} i(\tau)$$

In terms of the language of difference equations the problem is one of finding the "finite sum" of the function $I(\tau)$ in general terms. This can be done if $I(\tau)$ is expanded into a Fourier series and the finite sum for each term found.

Assuming that $I(\tau)$ is a periodic function with zero average value, it may be expanded into a Fourier series as follows:

$$I(\tau) = \sum_{n=1}^{\alpha}(A_n \cos n\tau + B_n \sin n\tau)$$

where $$A_n = \frac{1}{\pi}\int_0^{2\pi} I(\tau)\cos n\tau\, d\tau$$

$$B_n = \frac{1}{\pi}\int_0^{2\pi} I(\tau)\sin n\tau\, d\tau$$

It is verified by direct substitution that the solution of the difference Equation 7 is $$F(\tau) = \sum_{n=1}^{\infty}\left[\frac{A_n}{2\sin\frac{n\alpha}{2}}\sin n\left(\tau + \frac{\alpha}{2}\right) + \frac{-B_n}{2\sin\frac{n\alpha}{2}}\cos n\left(\tau + \frac{\alpha}{2}\right)\right] + k \quad (8)$$

where $k$ is an arbitrary constant. In order that the coefficients of the Fourier expansion may be recognized, the equation may be rewritten as $$F(\tau) = \sum_{n=1}^{\infty}\left[\frac{\left(A_n - B_n\cot\frac{n\alpha}{2}\right)}{2}\cos n\tau + \frac{\left(A_n\cot\frac{n\alpha}{2} + B_n\right)}{2}\sin n\tau\right] + k \quad (9)$$

The quantities in parentheses represent the coefficients in the Fourier expansion of $F(\tau)$.

It can be seen that solving for $F(\tau)$ for any given $I(\tau)$ involves finding the Fourier coefficients for $I(\tau)$ and then from these determining the Fourier coefficients for $F(\tau)$, and then finally, summing the components to obtain $F(\tau)$.

Also, Equation 8 reveals that there are certain restrictions which must be placed on the function $I(\tau)$. If $\alpha$ is such that $$\sin\frac{n\alpha}{2}$$

is zero for any positive integer $n$, then this $n$th harmonic in $F(\tau)$ is not finite. This means that $A_n$ and $B_n$ must be zero for values of $n$ which make $$\sin\frac{n\alpha}{2}\text{ zero}$$

and thus, a restriction is placed on the type of unsymmetrical function which can be generated. This does not negate the generator's use for functions which do not contain certain harmonics. Example II illustrates this restriction.

EXAMPLE II

This example illustrates very well the restrictions previously cited. Let it be desired to produce the waveform shown in Fig. 9.

The function $I(\tau)$ is defined mathematically as $$I(\tau) = 1,\ 0 < \tau < \frac{\pi}{4}$$

$$I(\tau) = 0,\ \frac{\pi}{4} < \tau < \frac{\pi}{2}$$

$$I(\tau) = -1,\ \frac{\pi}{2} < \tau < \frac{3\pi}{4}$$

$$I(\tau) = 0,\ \frac{3\pi}{4} < \tau < 2\pi$$

The Fourier series for $I(\tau)$ can be written as follows:

$$I(\tau) = \sum_{n=1}^{\infty}(A_n\cos n\tau + B_n\sin n\tau)$$

where $$A_n = \frac{1}{n\pi}\left[\sin\frac{n\pi}{4} - \sin\frac{3n\pi}{4} + \sin\frac{n\pi}{2}\right] \quad (10)$$

$$B_n = \frac{1}{n\pi}\left[-\cos\frac{n\pi}{4} + 1 + \cos\frac{3n\pi}{4} - \cos\frac{2\pi}{2}\right] \quad (11)$$

It will be noted that $A_n$ and $B_n$ are zero when $n=4, 8, 12$, etc. This absence of certain harmonics determines the choice of $\alpha$, which must be chosen such that $$\sin\frac{n\alpha}{2}\text{ is zero}$$

for only these values of $n$. The values of $\alpha$ which satisfy this criterion are $\pi/2$, $\pi/4$, $\pi/6$, etc. The first two, $$\alpha = \frac{\pi}{2}$$

and $$\alpha = \frac{\pi}{4}$$

yield the simplest solution and will be illustrated.

Solution where $\alpha = \pi/2$

The coefficients in the Fourier expansion of $F(\tau)$ can now be found by substituting $A_n$ and $B_n$ from Equations 10 and 11 into Equation 9. Algebraic manipulation reduces them to $$A'_n = \frac{A_n - B_n\cot\frac{n\alpha}{4}}{2} = \frac{1}{n\pi}\sin\frac{n\pi}{4}$$

$$B'_n = \frac{A_n\cot\frac{n\alpha}{4} + B_n}{2} = \frac{1}{n\pi}\left(1 - \cos\frac{n\pi}{4}\right)$$

where $A'_n$ and $B'_n$ refer to the coefficients of the cosine and sine terms respectively. These coefficients must also satisfy the following equations:

$$A'_n = \frac{1}{\pi}\int_0^{2\pi}F(\tau)\cos n\tau\, d\tau$$

$$B'_n = \frac{1}{\pi}\int_0^{2\pi}F(\tau)\sin n\tau\, d\tau$$

It can be seen that the function shown in Fig. 8 will satisfy the above equations. Therefore, it is the function which must be sketched on the rotor.

Solution where $\alpha = \pi/4$

Substituting into Equation 9 as in the previous case, the values of $A'_n$ and $B'_n$ will reduce to $$A'_n = \frac{A_n - B_n\cot\frac{n\pi}{8}}{2} = \frac{1}{n\pi}\sin\frac{n\pi}{2}$$

$$B'_n = \frac{A_n\cot\frac{n\pi}{8} + B_n}{2} = \frac{1}{n\pi}\left(1 - \cos\frac{n\pi}{2}\right)$$

A function similar to that in Fig. 8 but extending a distance $\pi/2$ along the circumference of the rotor is the function which must be sketched on the rotor.

Solution where $\alpha = \pi/6$, $\pi/8$, etc.

The solution for permissible values of $\alpha$ less than $\pi/4$ is more complex than the case where $\alpha$ is equal to $\pi/2$ or $\pi/4$. Fortunately, in these two cases the equations for $A'_n$ and $B'_n$ can be reduced to a form where $F(\tau)$ can be determined by inspection. This is a rare case as normally the function $F(\tau)$ would have to be found by actually summing the harmonics.

In addition to increased complexity, a choice of $\alpha$ less than $\pi/4$ would be undesirable for a number of other reasons. One is that the output current will be less than in the first two cases. As an example of this let $\alpha$ be equal to $\pi/8$. The solution is:

$$F(\tau)=1,\ 0<\tau<\frac{\pi}{8}$$

$$F(\tau)=2,\ \frac{\pi}{8}<\tau<\frac{\pi}{2}$$

$$F(\tau)=1,\ \frac{\pi}{2}<\tau<\frac{5\pi}{8}$$

$$F(\tau)=0,\ \frac{5\pi}{8}<\tau<2\pi$$

Here the maximum value of $F(\tau)$ is 2 rather than unity as before. Therefore, both $F(\tau)$ and $I(\tau)$ must be modified by a factor of ½ to conform to Equation 6 where the maximum value of $F(\tau)$ was assumed to be unity when the full length of the rotor is utilized. This means that the maximum current would be one half of that obtained by choosing $\alpha$ equal to $\pi/2$ or $\pi/4$. The output current would be even less for smaller values of $\alpha$, and in the limit as $\alpha$ approaches zero, the current would also approach zero.

Another undesirable feature of choosing $\alpha$ equal to $\pi/8$ is the possibility of a discontinuity at $\tau$ equal to $\pi/8$ and $(5/8)\pi$. This discontinuity could perhaps be held to a minimum but not eliminated altogether.

EXAMPLE III

Actually the symmetrical case may be considered a special case of the unsymmetrical generator where $\alpha$ is equal to $\pi$. However, due to its simplicity and the similarity between the wave sketched on the rotor and the output current waveform, it is considered separately. The only restriction placed on the output waveform is that it contain no even harmonics.

Let it be desired to produce the wave form shown in Fig. 6. Then the rotor would have to be segmented as shown in Fig. 4.

There are many possible modifications of this generator. It would, of course, be possible to use a permanently polarized dielectric (an electret) as a source of electric flux to replace the painted or metallic surfaces charged with a D. C. voltage. This would be analogous to using permanent magnets as sources of magnetic flux in an electromagnetic generator. Such a modified generator would probably lack flexibility, but would eliminate the requirement of slip-rings, brushes and a D. C. voltage source.

Just as electromagnetic generators are often built with more than one pole-pair, the stator of my generator could be divided into many segments. For example, if the stator had six segments, alternate segments forming the outputs could be connected in parallel. The operation would be similar to the generator shown in the drawing except that the frequency would be increased.

If three different functions were placed on the rotor plate and the output taken from one stator plate, the output wave would consist of the three separate functions sketched on the rotor plates, each function having a positive and negative portion and each separate function consecutively produced.

It is obvious that the function could be placed on the stator and the output taken from the rotor.

Also, of course, relative motion between the stator and rotor may be obtained in arrangements in which the stator and rotor are not concentric cylinders.

While in the foregoing specification I have set forth a specific structure in considerable detail for the purpose of illustrating an embodiment of my invention, it will be understood that such details may be varied widely by those skilled in the art without departing from the spirit and scope of my invention.

I claim:

1. In an electrostatic generator characterized by its capacity to produce an alternating current that is substantially independent of output voltage, the combination comprising at least one pair of conductive surfaces positioned in electrically separated relation, a member having at least one conducting surface, means to place a charge $q$ on the conductive surface of said member and means to support said member and said surfaces so that the conductive surface of said member is alternately in spaced-apart, facing relation with each of said surfaces so that the charge $q$ causes a flux $\psi$ to terminate on each of said surfaces when said member is in facing relation therewith, said support means also adapted to permit relative movement between said member and said surfaces at a spaced distance therefrom and in substantial alignment therewith, whereby the movement between said member and said surfaces causes a change $dq$ in the charge on said surfaces and a corresponding change $d\psi$ in the flux terminating on said surfaces with the result that a current $i$ is induced on said surfaces in accordance with the formula $$\frac{dq}{dt}=\frac{d\psi}{dt}=i$$

where $t$ is the time.

2. In a constant current electrostatic generator characterized by its capacity to produce an alternating current having a preselected wave shape, the combination comprising at least one pair of conductive surfaces, said surfaces having substantially the same dimensions and positioned in electrically separated relation, a member having at least one electrically separate conductive surface positioned a spaced distance from said surfaces, means to divide the conductive surface of said member into two electrically separate sectors along a line defined by the boundary curve of a wave shape placed thereon, the base axis of said wave shape lying in a plane perpendicular to the longitudinal axis of said member, means for placing a charge of electricity on the conductive surface of said member bounded by said curve and for placing a charge of different polarity on the area outside of the curve and on the separate surfaces, and means to support said member and said pair of surfaces for movement of one with respect to the other at a spaced distance therefrom and in substantial alignment therewith, whereby the relative movement between said member and said surfaces causes the area bounded by said curve to move into and out of spaced, facing relation with each of the surfaces, thereby changing the flux linkage between said bounded area and each of said surfaces with the result that an alternating current is produced having symmetrical positive and negative half cycles of a wave shape that is a substantial reproduction of the wave shape placed on said rotor surface, the capacitance between said member and said conductive surfaces being substantially independent of the relative positions thereof during operation of said generator.

3. In a constant current electrostatic generator characterized by its capacity to produce an alternating current having a preselected wave shape, the combination comprising a stator having two semi-cylindrical conducting surfaces of substantially equal dimensions positioned in electrically separated, facing relation to provide a cylindrical opening therebetween to receive a rotor, a rotor having a cylindrical conductive surface of substantially the same area as the combined areas of said stator surfaces mounted for rotation within said stator, means to divide said rotor surface into two electrically separate sectors along a line defined by the boundary curve of a wave shape placed thereon, the base axis of said wave shape lying in a plane perpendicular to the rotational axis of said rotor and means for placing a charge of electricity of one polarity on the rotor surface bounded by said curve and for placing a charge of subtsantially different polarity on said stator surfaces and on said rotor surface outside of the curve, whereby as said rotor is rotated, the rotor area bounded by said curve moves successively into and out of facing relation with each of said stator surfaces at a spaced distance therefrom, thereby changing the flux linkage between said stator surfaces and the rotor area bounded by said curve with the result that an alternating current is produced having symmetrical positive and negative half cycles of a wave shape that is a substantial reproduction of the wave shape placed on said rotor surface, the capacitance between said stator and rotor being substantially constant irrespective of the position of the rotor relative to the stator.

4. In a constant current electrostatic generator characterized by its capacity to produce an alternating current having a preselected wave shape, the combination comprising a member adapted to have current induced thereon having at least one pair of conductive surfaces, said surfaces having substantially the same dimensions and positioned in electrically separated relation, said surfaces also being of arcuate shape so as to provide a substantially cylindrical opening to receive a cylindrical member therein, a cylindrical member having at least one electrically separate conductive surface of substantially the same area as the combined areas of said first-mentioned member mounted in spaced-apart relation for movement within said first-mentioned member, means to divide the conductive surface of said cylindrical member into two electrically separate sectors along a line defined by the boundary curve of a wave shape placed thereon, the base axis of said wave shape lying in a plane perpendicular to the longitudinal axis of said cylindrical member, and means for placing a charge of one polarity on the conductive surface of said cylindrical member bounded by the curve and for placing a charge of different polarity on the area outside of the curve and on the surfaces of said first-mentioned member so that the capacitance between said surfaces and said member is substantially a constant value, whereby the relative movement between said members causes the area bounded by said curve to move into and out of spaced, facing relation with each of the surfaces of said first-mentioned member, thereby changing the flux linkage between said area bounded by the curve and each of the surfaces of said first-mentioned member with the result that an alternating current is produced having symmetrical positive and negative half cycles of a wave shape that is a substantial reproduction of the wave shape placed on the conductive surface of said first-mentioned member.

5. In a constant current electrostatic generator characterized by its capacity to produce an alternating current having a preselected wave shape, the combination comprising a stator having two arcuate conductive surfaces in electrically separated, facing relation to provide a cylindrical opening extending longitudinally therebetween to receive a rotor, a rotor having a cylindrical conductive surface of substantially the same area as the combined areas of said stator surfaces concentrically mounted for rotation within said stator, means to divide said rotor surface into two electrically separate sectors along a line defined by the boundary curve of a wave shape placed thereon, the base axis of said wave shape lying in a plane perpendicular to the rotation axis of said rotor, and means for placing a charge of electricity of one polarity on the rotor surface bounded by said curve and for placing a charge of substantially different polarity on said stator surfaces and on said rotor surface outside of the curve, whereby as said rotor is rotated the capacitance between said stator and rotor remains relatively constant and the rotor area bounded by said curve moves successively into and out of facing relation with each of said stator surfaces at a spaced distance therefrom, thereby changing the flux linkage between said stator surfaces and the rotor area bounded by said curve with the result that an alternating current is produced having a wave shape that is a substantial reproduction of the wave shape placed on said rotor surface.

6. In a constant current electrostatic generator characterized by its capacity to produce an alternating current having a preselected wave shape, the combination comprising a member adapted to have a current induced thereon and having at least one pair of conductive surfaces positioned in electrically separate relation, said surfaces also being of arcuate shape so as to provide a substantially cylindrical opening to receive a cylindrical member, a cylindrical member having at least one electrically separate conductive surface mounted in spaced-apart relation for movement within said first-mentioned member, and means to separate the conductive surface of said cylindrical member into two electrically separate sectors along a line defined by the boundary curve of a wave shape placed thereon, the base axis of said wave shape lying in a plane perpendicular to the longitudinal axis of said cylindrical member, and means for placing a charge of electricity of one polarity on the surface of said cylindrical member bounded by said curve, and for placing a charge of substantially different polarity on the area outside of the curve and on the surfaces of said first-mentioned member to maintain a substantially constant capacitance between said surfaces and member, whereby the relative movement between said members causes the area bounded by said curve to move into and out of spaced, facing relation with each of the surfaces of said first-mentioned member, thereby changing the flux linkage between said bounded area and each of the surfaces of said first-mentioned member with the result that an alternating current is produced having a wave shape that is a substantial reproduction of the wave shape placed on the surface of said cylindrical member.

7. In a constant current electrostatic generator characterized by its capacity to produce an alternating current having a preselected wave shape, the combination comprising at least one pair of conductive surfaces positioned in electrically separate relation, a member having at least one electrically separate conductive surface positioned a spaced distance from said separate surfaces, means to divide the conductive surface of said member into two electrically separate sectors along a line defined by the boundary curve of a wave shape placed thereon, means to support said member and said surfaces for movement of one with respect to the other at a spaced distance therefrom and in substantial alignment therewith, and means for placing a charge on the conductive surface of said member bounded by said curve and for placing a charge of different polarity on the area of said member outside of the curve and on said separate surfaces, whereby the relative movement between said member and said surface causes the area bounded by said curve to move into and out of spaced, facing relation with each of the separate surfaces, thereby changing the flux linkage between said bounded area and each of said surfaces, with the result that an alternating current is produced having a wave shape that is a substantial reproduction of the wave shape placed on the conductive surface of said member, the capacitance between said member and said conductive surfaces being substantially independent of the relative positions thereof during operation of said generator.

8. In an electrostatic generator characterized by its capacity to produce an alternating current that is substantially independent of output voltage, the combination comprising a stator having at least one pair of conductive surfaces positioned in electrically separate, facing relation to provide a cylindrical opening therebetween, a rotor having at least one conductive surface of substantially the same area as the combined areas of said stator surfaces concentrically mounted for rotation within said stator, means for placing a charge $q$ on a portion of the conductive surface of said rotor, and means to rotate said rotor, whereby as the charged surface of said rotor is alternatively in facing relation with each of said stator surfaces, the charge $q$ causes a flux $\varphi$ to terminate on each of said stator surfaces when the charged area of said rotor is in facing relation therewith, and the movement between said charged surface and said stator surfaces causes a change $dq$ in the charge between the charged area of said rotor and said stator surfaces and a corresponding change $d\varphi$ in the flux terminating on said stator surfaces with the result that a current $i$ is induced on said stator surfaces in accordance with the formula $$\frac{dq}{dt} = \frac{d\psi}{dt} = i$$

where $t$ is the time.

9. In an electrostatic generator characterized by its capacity to induce a current proportional to a wave shape that is a periodic function of time, the combination comprising a stator having two arcuate conductive surfaces in electrically separated, facing relation, providing a cylindrical opening extending longitudinally therebetween, one surface of said stator having an angular width $a$, a cylindrical rotor having a conductive surface of substantially the same area as the combined areas of said stator surfaces and of substantially the same length, said rotor concentrically mounted for rotation within said stator, means to divide the conducting surface of said rotor into two electrically separate sectors along the boundary curve of a function $F(\tau)$ placed thereon, means to impress a D. C. voltage on the area of said rotor surface under the curve $F(\tau)$, and means to rotate said rotor at a constant angular velocity, whereby the output current $i$ of said generator is equal to $$K[F(\tau) - F(\tau - a)]$$

where K is a constant.

ROBERT G. BROWN.

References Cited in the file of this patent

UNITED STATES PATENTS

| Number | Name | Date |
|---|---|---|
| 1,283,492 | Frost | Nov. 5, 1918 |
| 1,415,779 | Bowen | May 9, 1922 |
| 2,147,948 | Kent | Feb. 21, 1939 |
| 2,248,661 | Culver | July 8, 1941 |

FOREIGN PATENTS

| Number | Country | Date |
|---|---|---|
| 2,422 | Great Britain | of 1912 |